United States Patent
Yang et al.

(10) Patent No.: US 12,477,546 B2
(45) Date of Patent: Nov. 18, 2025

(54) HARQ-ACK FEEDBACK AND INTRA-UE MULTIPLEXING

(71) Applicant: QUALCOMM Incorporated, San Diego, CA (US)

(72) Inventors: Wei Yang, San Diego, CA (US); Yi Huang, San Diego, CA (US)

( * ) Notice: Subject to any disclaimer, the term of this patent is extended or adjusted under 35 U.S.C. 154(b) by 393 days.

(21) Appl. No.: 18/173,713

(22) Filed: Feb. 23, 2023

(65) Prior Publication Data

US 2023/0276449 A1 Aug. 31, 2023

Related U.S. Application Data

(60) Provisional application No. 63/314,264, filed on Feb. 25, 2022.

(51) Int. Cl.

| | |
|---|---|
| *H04W 72/21* | (2023.01) |
| *H04L 1/08* | (2006.01) |
| *H04L 5/00* | (2006.01) |
| *H04W 72/11* | (2023.01) |
| *H04W 72/563* | (2023.01) |

(52) U.S. Cl.
CPC .............. *H04W 72/21* (2023.01); *H04L 1/08* (2013.01); *H04L 5/0055* (2013.01); *H04W 72/11* (2023.01); *H04W 72/563* (2023.01)

(58) Field of Classification Search
CPC ....... H04L 5/0055; H04L 1/08; H04L 1/1854; H04L 1/1896; H04L 1/189; H04L 1/1861; H04L 5/0094; H04L 5/0053; H04W 72/563; H04W 72/11; H04W 72/21
See application file for complete search history.

(56) References Cited

U.S. PATENT DOCUMENTS

| | | | |
|---|---|---|---|
| 2022/0183038 A1* | 6/2022 | Saber | H04L 1/1896 |
| 2023/0189276 A1* | 6/2023 | Chen | H04W 72/563 |
| | | | 370/329 |
| 2024/0073874 A1* | 2/2024 | Su | H04L 1/189 |
| 2024/0188053 A1* | 6/2024 | Yamamoto | H04W 72/21 |
| 2024/0365330 A1* | 10/2024 | Ouchi | H04W 72/0446 |
| 2024/0372669 A1* | 11/2024 | Lin | H04L 5/005 |
| 2024/0389097 A1* | 11/2024 | Yang | H04L 27/2601 |
| 2025/0016775 A1* | 1/2025 | Zhang | H04W 72/563 |
| 2025/0063564 A1* | 2/2025 | Ouchi | H04L 1/0045 |

OTHER PUBLICATIONS

Ericsson: "Maintenance Issues on UCI Multiplexing on PUCCH", R1-1814193, 3GPP TSG-RAN WG1 Meeting #95, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 15, 2018, Nov. 19, 2018, XP051494650, 13 Pages, p. 5, last item of itemized list p. 5, implicit from last item of itemized list p. 5, box titled section 9.2.6, p. 4, section 9.2.5.

(Continued)

*Primary Examiner* — Brian D Nguyen

(57) ABSTRACT

Certain aspects of the present disclosure provide techniques for wireless communication by a user equipment (UE). According to certain aspects, a UE may be configured to determine that content of at least two first single-slot physical uplink control channel (PUCCHs) is to be multiplexed on to a second PUCCH, based on at least one rule, and process the second PUCCH, based on the at least one rule.

21 Claims, 15 Drawing Sheets

(56) References Cited

OTHER PUBLICATIONS

Partial International Search Report—PCT/US2023/063241—ISA/EPO—Jun. 13, 2023.
ZTE: "Remaining Issues on Intra-UE Multiplexing in Rel-16 URLLC", 3GPP TSG RAN WG1 Meeting #105-e, R1-2104322, 3rd Generation Partnership Project, Mobile Competence Centre; 650, Route Des Lucioles, F-06921 Sophia-Antipolis Cedex, France, vol. Ran WG1, No. e-Meeting, May 10, 2021-May 27, 2021, May 12, 2021, XP052010752, 6 Pages, p. 4, box above last par.
International Search Report and Written Opinion—PCT/US2023/063241—ISA/EPO—Sep. 15, 2023.
Moderator (Qualcomm): "FL Summary of PUCCH Coverage Enhancement", 3GPP TSG RAN WG1 #106bis-e, R1-2110441, 3rd Generation Partnership Project, Mobile Competence Centre, 650, Route Des Lucioles, F-06921 Sophia-Antipolis Cedex, France, vol. RAN WG1, No. e-Meeting, Oct. 10, 2021-Oct. 19, 2021, Oct. 12, 2021, XP052060386, 17 Pages, p. 5, rows "Intel," "Samsung," and "Apple;" p. 6 row "CATT".

\* cited by examiner

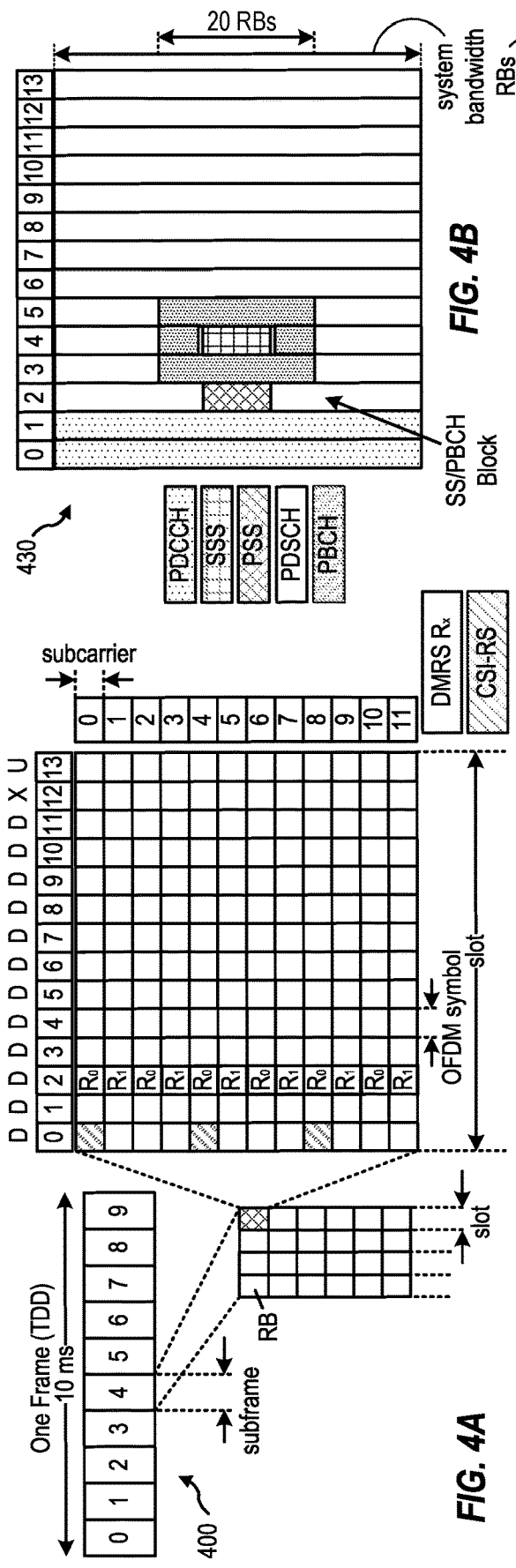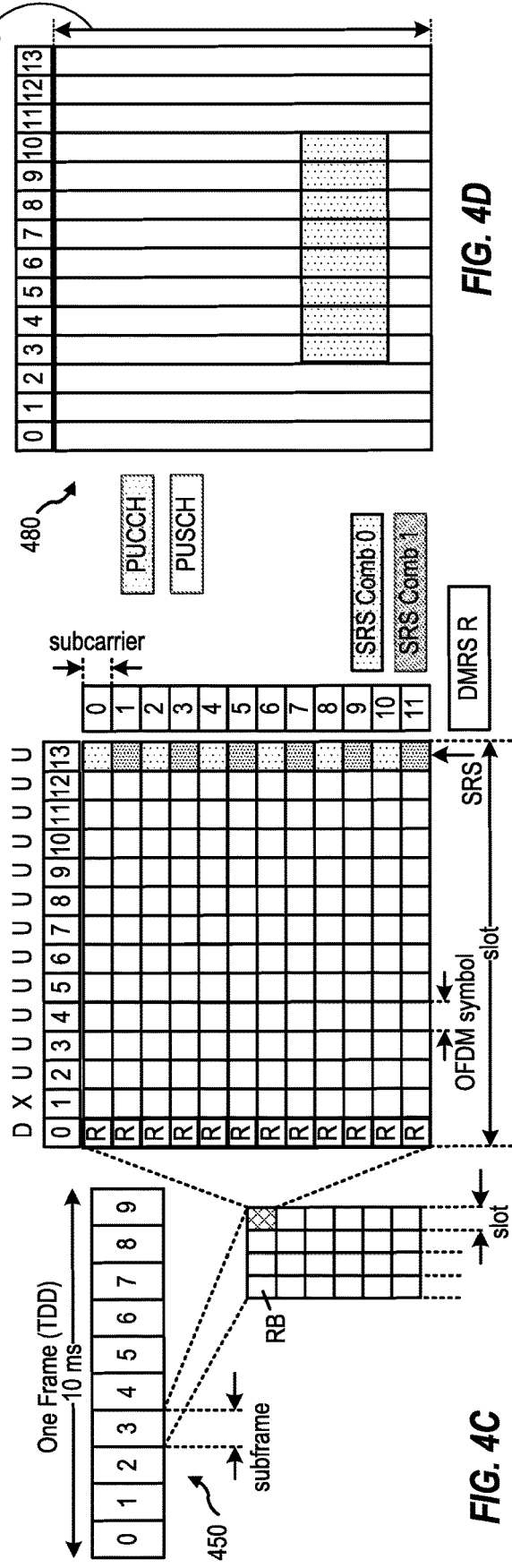

HARQ-ACK FEEDBACK AND INTRA-UE MULTIPLEXING

RELATED APPLICATIONS

This application claims benefit of and priority to U.S. Patent Application Ser. No. 63/314,264, filed Feb. 25, 2022, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for providing feedback by a user equipment (UE).

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a user equipment (UE), including determining that content of at least two first single-slot physical uplink control channel (PUCCHs) is to be multiplexed on to a second PUCCH, based on at least one rule, and processing the second PUCCH, based on the at least one rule.

One aspect provides a method for wireless communication by a network entity, including determining that content of at least two first single-slot physical uplink control channel (PUCCHs) is to be multiplexed by a user equipment (UE) on to a second PUCCH, based on at least one rule, and processing the second PUCCH, based on the at least one rule.

One aspect provides a method for wireless communication by a user equipment (UE), including receiving, from a network entity, signaling configuring a user equipment (UE) with a radio resource control (RRC) parameter indicating physical uplink control channel (PUCCH) resources for acknowledgement feedback for semi-persistently scheduled (SPS) physical downlink shared channels (PDSCHs), receiving an activation DCI activating SPS PDSCH transmissions with a PUCCH resource indicator (PRI) indicating a PUCCH resource from one or more PUCCH resource sets used for reporting acknowledgment feedback for dynamic PDSCHs, and processing a PUCCH for reporting acknowledgment for a first SPS PDSCH after the activation DCI, based on a rule designed to ensure that the UE selects a same PUCCH resource for acknowledging a first SPS PDSCH after the activation DCI, regardless of whether the UE treats a first SPS PDSCH after the activation DCI as: a dynamically scheduled PDSCH, in which case the PUCCH for acknowledgment feedback is based on a PUCCH resource indicator (PRI) in the activation DCI, or an SPS PDSCH, in which case the PUCCH for acknowledgment feedback is based on the RRC parameter.

One aspect provides a method for wireless communication by a network entity, including configuring a user equipment (UE) with a radio resource control (RRC) parameter indicating physical uplink control channel (PUCCH) resources for acknowledgement feedback for semi-persistently scheduled (SPS) physical downlink shared channels (PDSCHs), transmitting the UE an activation DCI activating SPS PDSCH transmissions with a PUCCH resource indicator (PRI) indicating a PUCCH resource from one or more PUCCH resource sets used for reporting acknowledgment feedback for dynamic PDSCHs, and taking action so the UE selects a same PUCCH resource for acknowledging a first SPS PDSCH after the activation DCI, regardless of whether the UE treats a first SPS PDSCH after the activation DCI as: a dynamically scheduled PDSCH, in which case the PUCCH for acknowledgment feedback is based on a PUCCH resource indicator (PRI) in the activation DCI, or an SPS PDSCH, in which case the PUCCH for acknowledgment feedback is based on the RRC parameter.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communication network.

DETAILED DESCRIPTION

Figure 1:
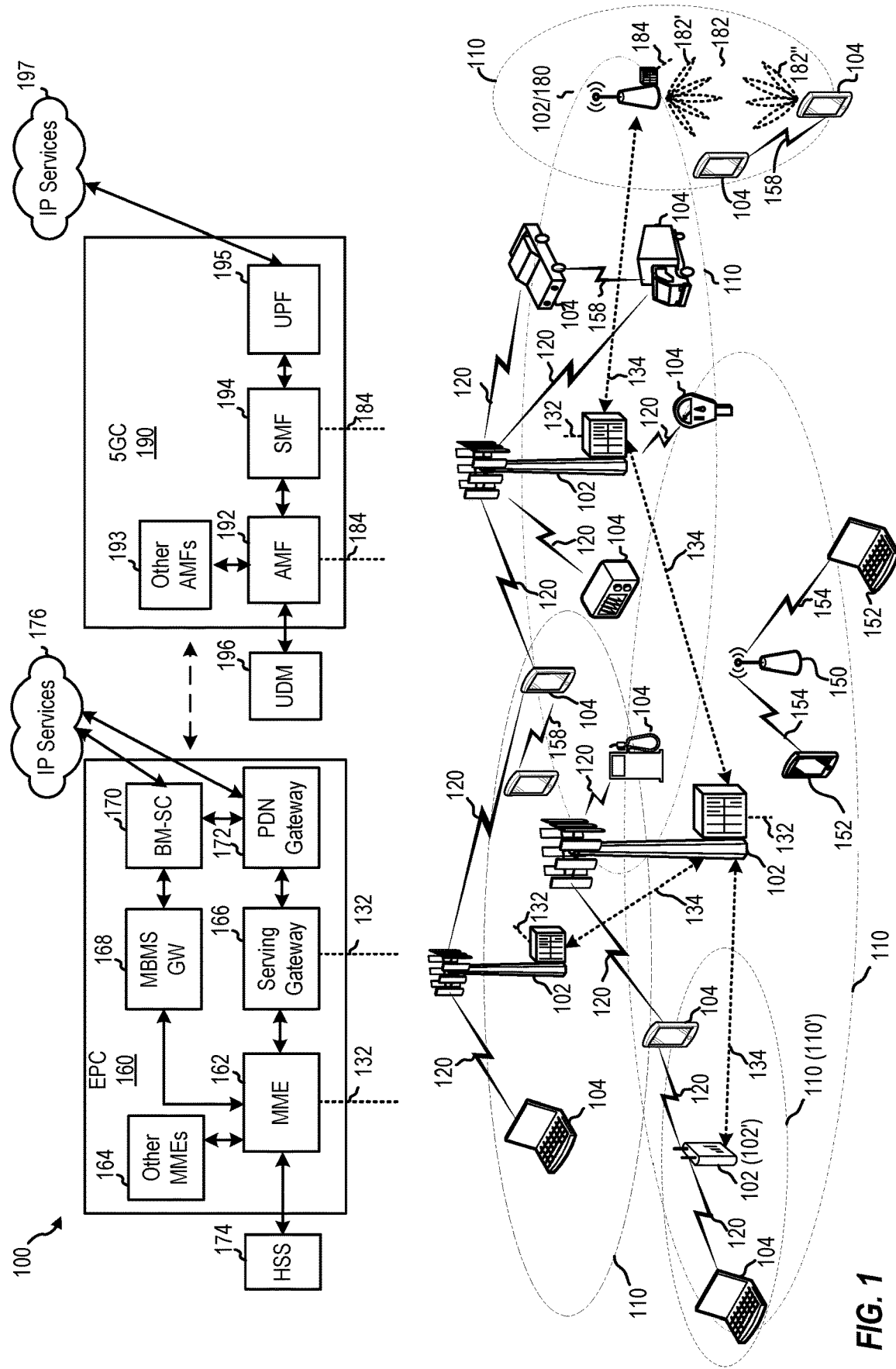
FIG. 1 depicts an example wireless communication network.

Aspects of the present disclosure provide apparatuses, methods, processing systems, and computer-readable mediums for providing feedback, by a user equipment (UE), in the form of uplink control information (UCI).

UCI is carried by a physical uplink control channel (PUCCH) or, in some cases, a physical uplink shared channel (PUSCH). There are three general types of information conveyed by UCI: scheduling requests (SRs), hybrid automatic repeat request (HARQ) acknowledgement/negative acknowledgment (ACK/NACK) feedback, and channel quality information (CQI). A UE may transmit one or a combination of these types of UCI, depending on the scenario (e.g., a UE could send an SR or an SR with HARQ ACK/NACK feedback).

UCI is sent on PUCCH resources that may be configured (e.g., via radio resource control-RRC signaling) or dynamically indicted. In certain instances, a UCI may be scheduled to send UCI on overlapping PUCCH resources (e.g., two PUCCHs that overlap in time). In certain such cases, the UE may be configured to combine (multiplex) the content from each of the overlapping PUCCHs onto one of the overlapping PUCCHs or onto a single new PUCCH. There may be certain challenges with multiplexing UCI in this manner.

For example, some rules may dictate that a UE may only multiplex UCI content that is of the same priority. If the UCI content from overlapping PUCCHs is of different priority, such rules may dictate that the lower priority UCI content is dropped. In some cases, multiplexing of UCI content of different content may be allowed, but with constraints (e.g., provided that none of the overlapping PUCCHs are scheduled with repetition).

Aspects of the present disclosure, however, provide mechanisms that may provide greater flexibility for multiplexing UCI. For example, the mechanisms described herein may help define UE/network entity (e.g., gNB) behavior to handle scenarios when content of multiple single-slot PUCCHs is multiplexed on to another PUCCH. For example, the mechanisms described herein may provide rules that define behavior when multiplexing UCI of multiple single-slot PUCCHs results in a multi-slot PUCCH (e.g., a PUCCH configured with repetition). Thus, these mechanisms may help improve resource utilization and overall system performance, allowing UCI to be conveyed efficiently and with minimal latency.

Certain aspects of the present disclosure also help define UE/network entity (e.g., gNB) behavior when a mix of dynamically scheduled and semi-persistently scheduled physical downlink shared channel (PDSCH) transmissions map to the same acknowledgment resources.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

FIG. 1 depicts an example of a wireless communication network 100, in which aspects described herein may be implemented.

Generally, wireless communication network 100 includes various network entities (alternatively, network elements or network nodes). A network entity is generally a communications device and/or a communication function performed by a communications device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). ABS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
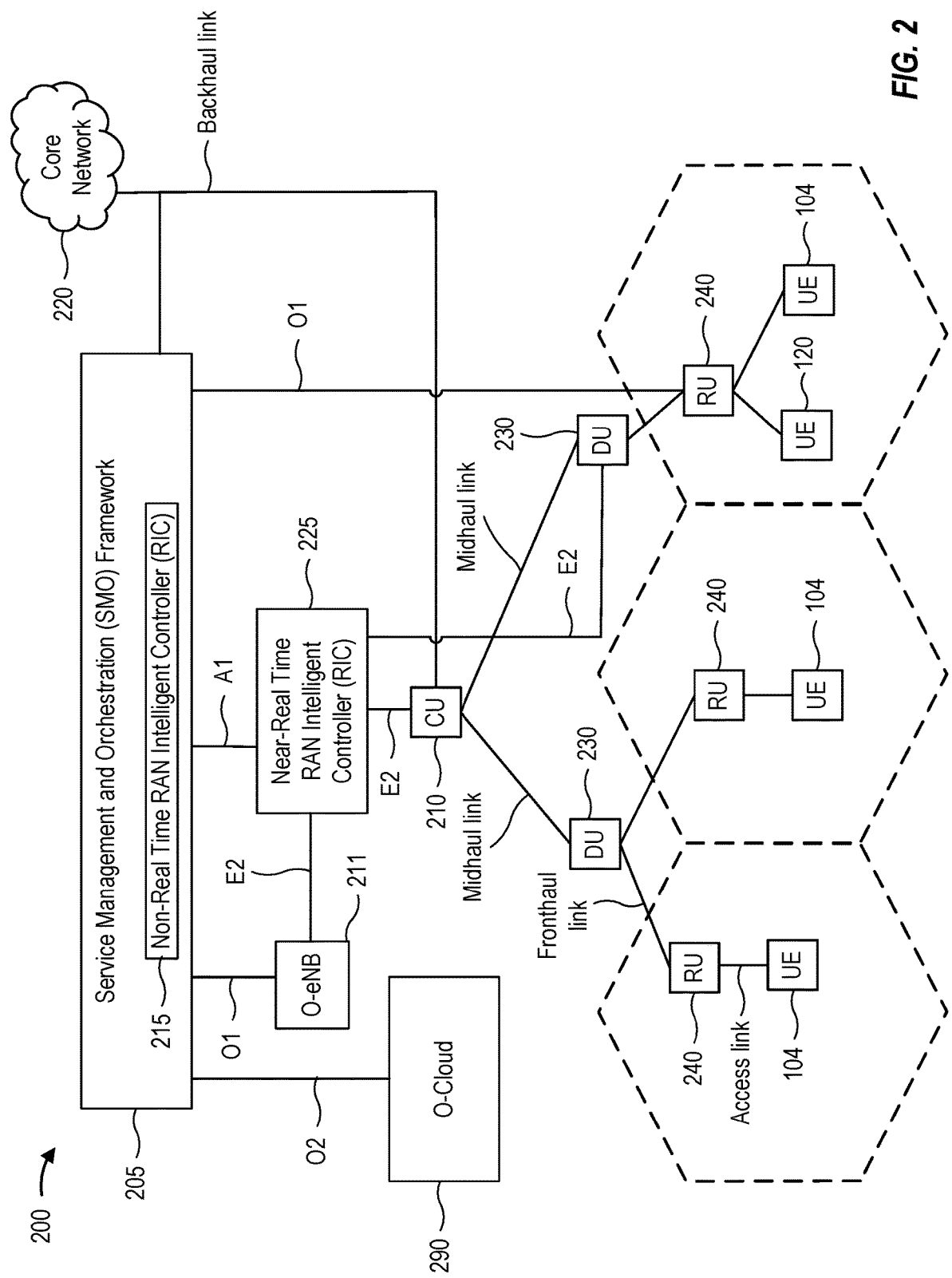
FIG. 2 depicts an example disaggregated base station architecture.

While BSs 102 are depicted in various aspects as unitary communications devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT MC 225, the Non-RT RIC 215 may receive parameters or external enrichment information from external servers. Such information may be utilized by the Near-RT MC 225 and may be received at the SMO Framework 205 or the Non-RT MC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
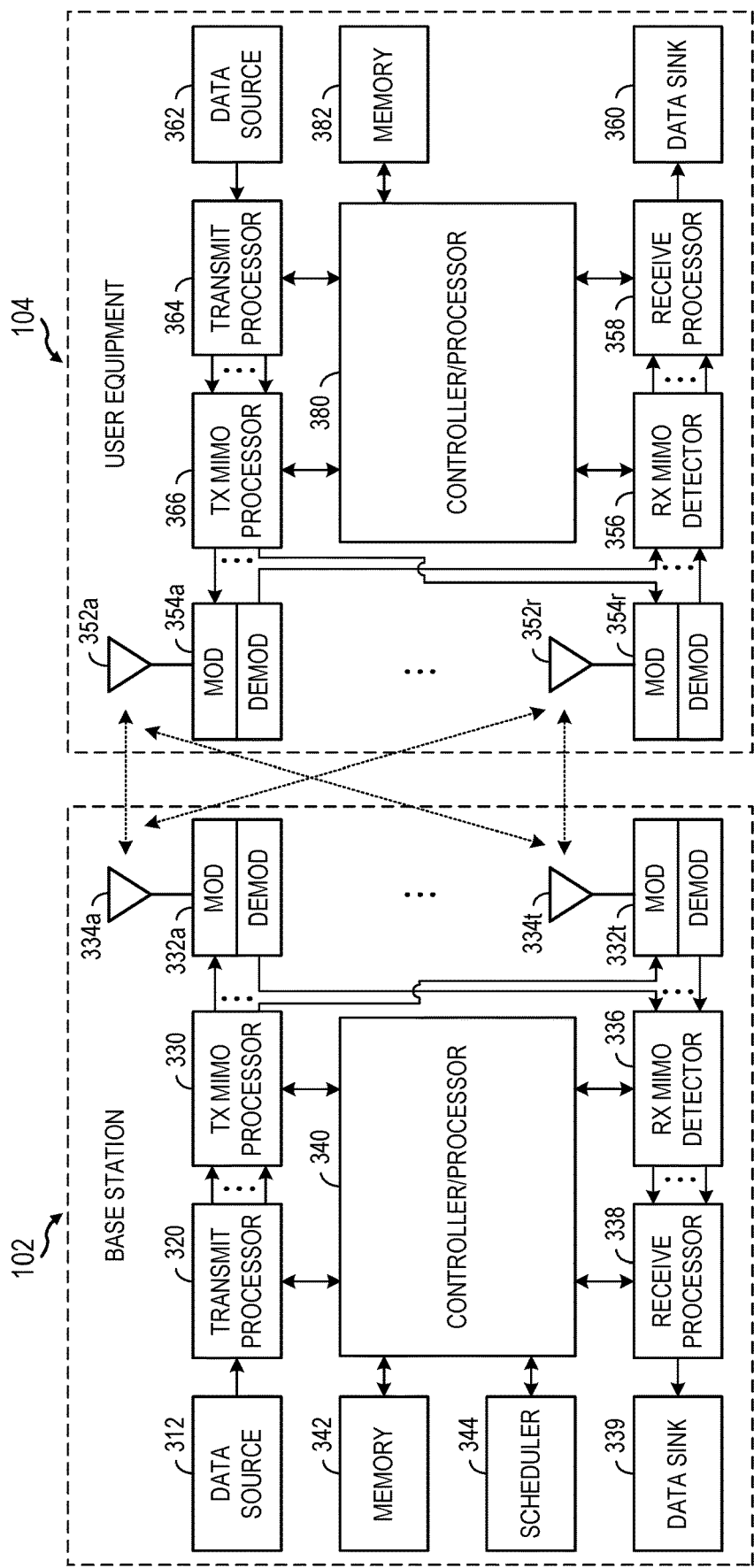
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., data source 362) and wireless reception of data (e.g., data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communication network, such as wireless communication network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 4A and 4C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of PUCCH Resource Selection

Figure 5A:
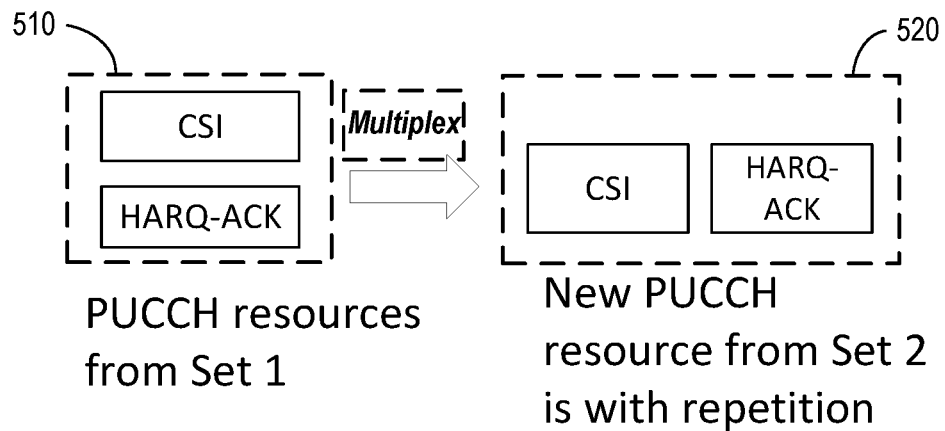
FIGS. 5A and 5B depict examples of physical uplink control channel (PUCCH) resources.

As illustrated in FIG. 5A, in certain systems (e.g., per NR release 15), if two PUCCHs transmissions overlap in time (i.e., in overlapping in at least one OFDM symbol), the UE may not be able to transmit both PUCCHs. Instead, as noted above, if both PUCCH transmissions are without repetition, then the UE may multiplex the content (i.e., UCI such as CSI and HARQ-ACK as shown at 510) of both PUCCHs onto one PUCCH, as shown at 510. In the illustrated example, the UCI multiplexed onto one PUCCH includes CSI and HARQ-ACK feedback.

This resulting PUCCH could be either of the two overlapping PUCCHs or a new PUCCH. If at least one of the two PUCCHs is scheduled with a repetition, current rules would dictate that the UE would drop one PUCCH and transmit the other (e.g., based on UCI type priority and the starting slot index of the two PUCCHs). PUCCH scheduled with repetition (across multiple slots/sub-slots) may also be referred to as multi-slot PUCCH.

In some systems (e.g., NR release 16), two priority indices were introduced for each uplink transmission, where priority index 1 means high priority and priority index 0 means low priority. Such systems may dictate that the UE only multiplex channels with the same priority index together, and the UE will drop the low priority channel and transmit high priority channel in case two channels with different priorities overlap.

In some systems (e.g., NR release 17), procedures have been introduced to allow a UE to multiplex UCI with different priorities onto a same PUCCH provided that none of the overlapping PUCCHs are scheduled with repetitions.

Aspects of the present disclosure provide UE and network entity (gNB) behavior to handle the scenario where the resulting PUCCH from multiplexing UCI of multiple single-slot PUCCHs becomes a multi-slot PUC CH (i.e., PUCCH repetition). For example, the techniques proposed herein may help the UE and gNB agree on a selection of PUCCH resources in such cases.

Figure 5B:
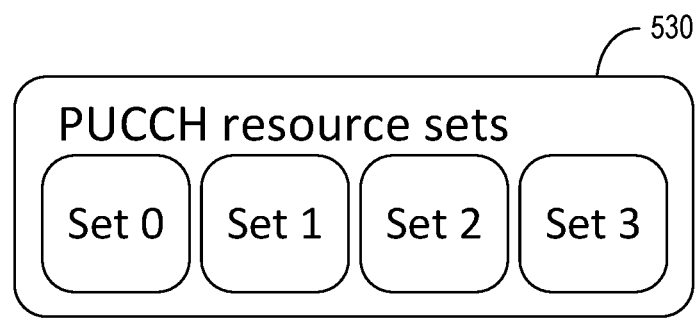

For HARQ-ACK feedback, a UE typically determines a PUCCH resource (from a PUCCH resource set, from a group of PUCCH resource sets 530) as shown in FIG. 5B) based on a parameter provided in a downlink control information (DCI) carrying a downlink grant, referred to as "PUCCH resource indicator/PRI," that schedules the HARQ-ACK feedback, and on the payload size (i.e., number of information bits) of the HARQ-ACK feedback.

The UE will first determine a PUCCH resource set based on the payload size, then the UE determines a PUCCH resource from the determined PUCCH resource set based on the PRI.

Because of this dependence on payload size, in case of intra-UE multiplexing (meaning the same UE multiplexing different UCI of its own), the UE may need to switch PUCCH resource set after multiplexing, since the total payload size increases after multiplexing. In this case, a new PUCCH resource from a different PUCCH resource set with the same PRI index will be used to transmit the multiplexed UCI.

Furthermore, different PUCCH resources could have different configurations with regard to a repetition factor (the number of repetitions). For example, in some systems (e.g., NR R-15), PUCCH repetition may be configured per PUCCH format (i.e., all PUCCH resources with the same PUCCH format shall have the same repetition factor). In other systems (e.g., NR R-17), the PUCCH repetition factor may be configured per PUCCH resource (e.g., different PUCCHs of the same format could have different repetition factors).

This creates a potential challenge of how the UE and gNB should behave if the new PUCCH resource is configured with repetition.

In some cases, (e.g., NR Rel-15/16), if a UE is scheduled with a PUCCH repetition factor K>1, the UE will find K slots, where each slot contains enough OFDM symbols for the PUCCH.

Figure 6:
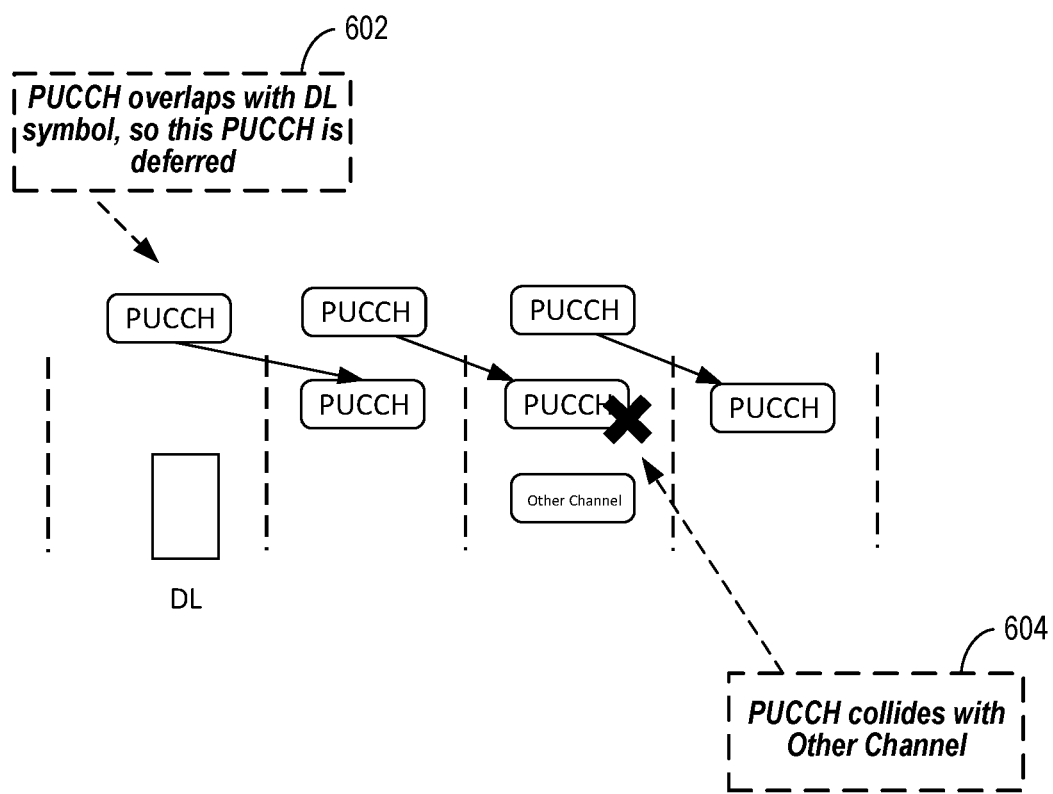
FIG. 6 depicts an example of PUCCH deferral.

As illustrated in FIG. 6, in time division duplexed (TDD) scenarios, if a slot does not contain enough orthogonal frequency division multiplexed (OFDM) symbols due to half-duplex restrictions (e.g., some symbols of the slot are configured to be downlink), the UE may be expected to defer the transmission until the next slot. For example, if a PUCCH overlaps with a downlink symbol as shown at 602, that PUCCH may be deferred. As shown at 604, however, a deferred PUCCH transmission in a slot may be cancelled due to a collision with another channel. In other words, in this case, the UE may not be expected to (again) defer the PUCCH to another slot.

Aspects Related to UCI Multiplexing

Aspects of the present disclosure provide mechanisms that may help define UE and network entity (gNB) behavior to handle the scenario when multiplexing content of at least two PUCCHs on to another PUCCH. For example, the mechanisms may involve a set of rules that define behavior when multiplexing UCI of multiple single-slot PUCCHs results in a multi-slot PUCCH (i.e., a PUCCH configured with repetition). For example, the techniques proposed herein may help the UE and gNB agree on a selection of PUCCH resources in such cases.

According to certain aspects, if a UE multiplexes UCI that is associated with two or more single-slot/subslot PUCCHs onto a new PUCCH, the UE may not expect the new PUCCH to be configured with repetitions (the UE may treat this as an error case and refrain from transmitting the new PUCCH if such configuration is detected as it may conflict with a rule). This scheduling restriction may be further restricted, for example, to 1) UCI of the same priority or 2) UCI of different priorities. In other words, it may be expected that the new PUCCH is not to be configured with repetition if the multiplexed UCI are of the same priorities (or, alternatively, if the UCI is of different priorities). One way to help meet this expectation is to try and ensure that PUCCH resources in different PUCCH resource sets associated with the same PRI code point are configured with the same repetition factor (e.g., 1 vs >1).

According to certain aspects, if a UE multiplexes UCI associated with two or more single-slot PUCCHs onto a new PUCCH in a slot, how the new PUCCH is processed may depend on a rule. For example, a rule may dictate that UE and network behavior, if the new PUCCH is configured with repetition. In such cases, the UE may not expect: 1) the new PUCCH to overlap with other PUCCHs in the slot (with or without repetition), and optionally in subsequent slots in which the repetition occurs; and/or 2) the PUCCH cannot be transmitted in the slot due to half duplex conflict. In other words, the UE may not expect to defer such PUCCH with repetition in the initial slot of the repetition.

According to certain aspects, in case the new PUCCH is configured with repetition, and includes multiple UCI types or UCI priorities (0 and 1), the priority of the new PUCCH may be treated to be the same as the highest priority of the multiple UCI (based on the priority index as well as the UCI priority type). For example, if the new PUCCH includes both high priority (HP) and low priority (LP) HARQ-ACK, then the new PUCCH may be considered to have same priority as HP HARQ-ACK. For example, if the new PUCCH includes both HARQ-ACK and CSI, then the new PUCCH may be considered to have the same UCI priority type as HARQ-ACK, since HARQ-ACK has a higher UCI type priority than HARQ-ACK. This priority determination may be used for various purposes, for example, when 1) solving collision with PUCCHs in other slots and/or 2) solving collision with PUCCH includes HARQ-ACK for sidelink communication.

Overview of SPS PDSCH and HARQ-ACK Feedback

Certain aspects of the present disclosure may also help define UE/network entity (e.g., gNB) behavior when the UE behavior for HARQ-ACK feedback for the first SPS PDSCH after the activation DCI (with or without other dynamically scheduled PDSCH HARQ-ACK in the same slot/acknowledgement resource). For example, aspects of the present disclosure may address the case when there is a mix of dynamically scheduled and semi-persistently scheduled (SPS) physical downlink shared channel (PDSCH) transmissions map to the same acknowledgment resources. For example, the techniques may help determine UE and network behavior in a scenario shown in FIG. 7, where two dynamically scheduled PDSCHs (scheduled by DCI1 and DCI3) and one SPS PDSCH triggered by DCI2 (that activates SPS PDSCHs) all map to the same PUCCH resource for ACK/NACK feedback. In this example, an ACK/NACK codebook may have three bits a0, a1, and a2 as feedback for these three PDSCHs.

In such cases where SPS PDSCH is supported, in which a UE is RRC configured with the periodicity, a PUCCH resource for HARQ-ACK feedback (e.g. using RRC parameter sps-PUCCH-AN-List-r16 or n1PUCCH-AN), and other parameters for the PDSCH transmission (e.g., the MCS, the time/frequency domain resource allocation, DMRS configuration), these may all be indicated by the activation DCI. The SPS PDSCH will be considered as active (i.e., a UE may try to decode/receive the SPS PDSCH) only when the UE receives the activation DCI. For Type 2 HARQ-ACK codebook construction, the HARQ-ACK corresponding to SPS PDSCH may be appended to the end of the HARQ-ACK codebook of the dynamically scheduled PDSCH.

One potential challenge is that, for a first SPS PDSCH after the activation DCI, there are different views/interpretations. In the example shown in FIG. 7, DCI2 activates SPS PDSCH at 704.

According to a first interpretation (Interpretation 1), the first SPS PDSCH after the activation DCI may be treated as dynamically scheduled PDSCH. In this case, the PUCCH resource for HARQ-ACK feedback may be determined by the PRI in the activation DCI, instead of the RRC parameter listed above. For Type-2 HARQ-ACK codebook construction, the HARQ-ACK bits may be placed in the HARQ-ACK codebook according to the (downlink assignment indication) DAI field (e.g., counter DAI) in the activation DCI.

According to a second interpretation (Interpretation 2), the first SPS PDSCH after the activation DCI may be treated the same way as SPS PDSCH, where the HARQ-ACK feedback is transmitted on the PUCCH resource configured by the RRC parameter listed above. Furthermore, the HARQ-ACK bits corresponding to the first SPS PDSCH may be appended to the end of the HARQ-ACK codebook of the dynamically scheduled PDSCHs.

The possibility of these different interpretations presents a potential challenge. For example, given different UE implementations based on different interpretations, there may be confusion for the network entity (e.g., gNB) in terms of the exact UE behavior (e.g., which interpretation will the UE apply).

Figure 7:
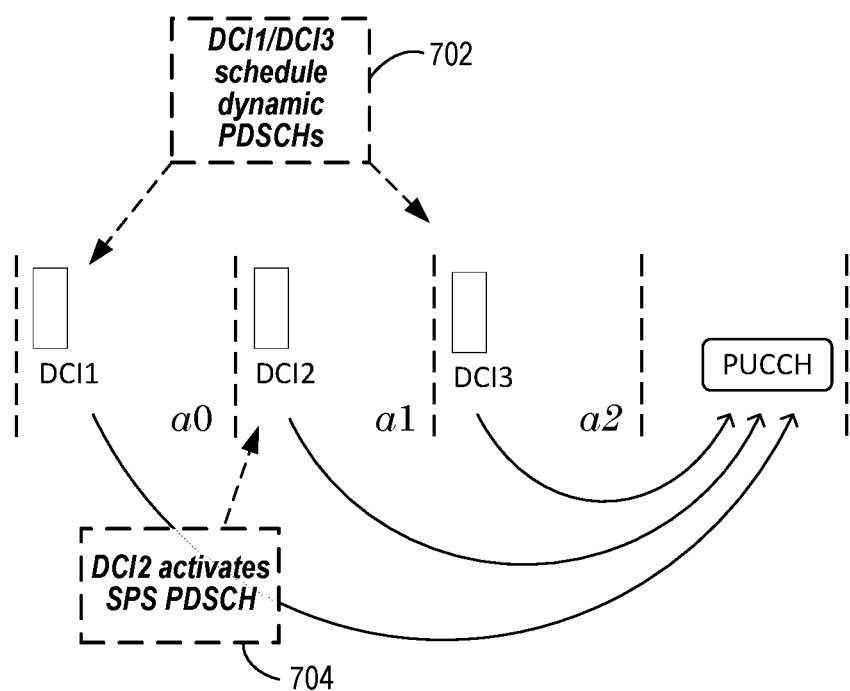
FIG. 7 depicts an example of feedback for multiple physical downlink shared channel (PDSCH) transmissions mapping to a single PUCCH.

Referring back to the example of FIG. 7, as shown at 702, DCI 1 and DCI 3 are DL grants scheduling dynamic PDSCHs and associated HARQ-ACK feedbacks, and DCI 2 is a DCI that activates a set of SPS PDSCH transmissions, including a first SPS PDSCH in the set, whose HARQ-ACK feedback is to be reported together with the HARQ-ACKs for DCI 1 and DCI 3, then the PUCCH resource selection may depend on the interpretation. For example, according to Interpretation 1, the HARQ-ACK bits in Type2 HARQ-ACK CB is [a0,a1,a2], since a1 for 1st SPS PDSCH is treated as a dynamic PDSCH. On the other hand, for Interpretation 2, the HARQ-ACK bits in Type 2 HARQ-ACK CB is [a0,a2,a1], since a1 for 1st SPS PDSCH is treated as HARQ-ACK for SPS PDSCH, and hence are appended to the end of the Type-2 HARQ-ACK CB.

Aspects Related to SPS PDSCH and HARQ-ACK Feedback

Figure 8:
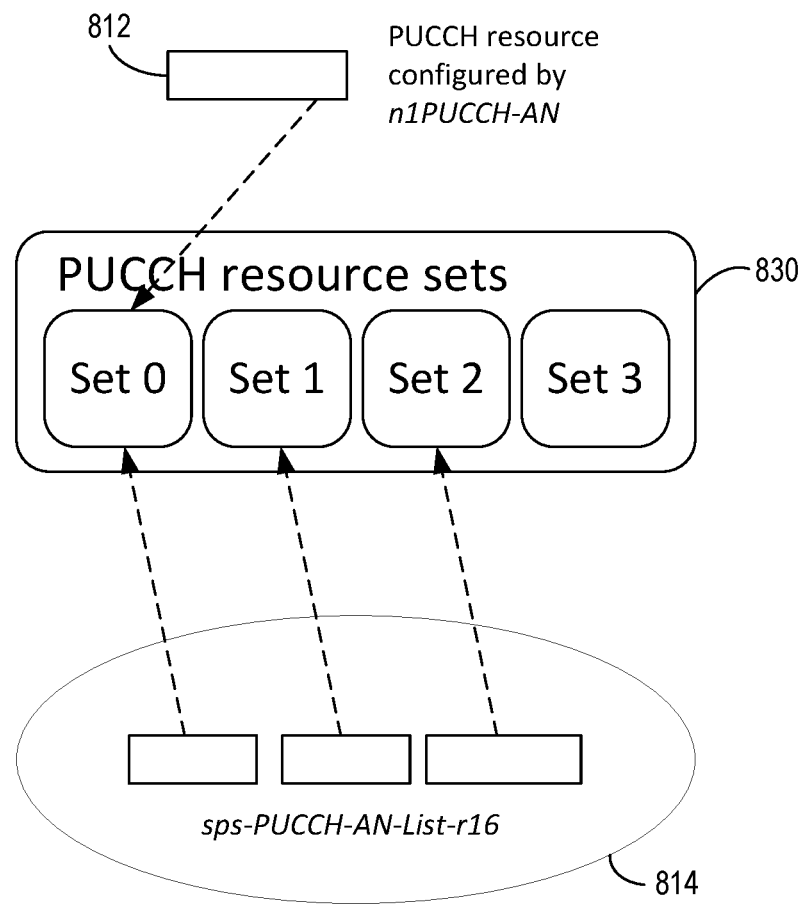
FIG. 8 depicts example physical uplink control channel (PUCCH) resources.

According to certain aspects, to provide consistency in resource selection regardless of the interpretation used by the UE, in case only one SPS PDSCH configuration is configured to the UE, then the gNB may make sure that the PUCCH resource configured by RRC (i.e., parameter n1PUCCH-AN as illustrated in FIG. 8 at 812) is included in the (1st) PUCCH resource set (Set 0 of PUCCH resource sets 830) for reporting HARQ-ACK feedback for dynamic PDSCHs.

According to certain (other) aspects, in case the UE is configured with sps-PUCCH-AN-List-r16 (per FIG. 8 at 814), the gNB may be required to make sure that every PUCCH resource in the list of PUCCH resources in sps-PUCCH-AN-List-r16 814 must be contained in one of the PUCCH resource sets 830 used for reporting HARQ-ACK feedback for dynamic PDSCHs.

The gNB may also need to make sure that, the payload size range (e.g., maximum payload size) for each PUCCH resources in sps-PUCCH-AN-List-r16 is the same as the payload size range for the PUCCH resource sets configured to the UE. With these limitations, it guarantees that gNB could indicate the same PUCCH resource using the PRI field in the DCI as the PUCCH resource 812 configured in n1PUCCH-AN or sps-PUCCH-AN-List-r16 814. In both cases, the repetition factor may also be the same, which is determined based on the PUCCH resource configured in n1PUCCH-AN or sps-PUCCH-AN-List-r16.

According to certain aspects, in case the gNB activates an SPS configuration using DCI, and if UE is configured with Type-2 HARQ-ACK CB, then the gNB shall make sure that the activation DCI is the last DCI among the DCIs that triggers HARQ-ACK transmissions in the same slot/sub slot. This may help guarantee that, regardless of which interpretation the UE follows, it may always end up with the same resulting HARQ-ACK CB. This also includes, as a special case, that only HARQ-ACK corresponding to SPS PDSCH is reported in the slot, in which case the activation DCI is (simply) the last DCI that triggers HARQ-ACK transmission in the slot. More generally, however, if the DCIs that triggers HARQ-ACK transmissions in the same slot includes more than one SPS PDSCH activation DCI, the gNB may make sure that any such activation DCIs are received after the DCIs that trigger dynamic PDSCH. Furthermore, among the more than one SPS PDSCH activation DCIs that trigger HARQ-ACK transmission in the same slot, the gNB may make sure that they are received by the UE in the following order: if two SPS PDSCH configurations are configured on different serving cells, then the activation DCI corresponding to the SPS PDSCH of a smaller cell index should be received by the UE prior to the activation DCI corresponding to the SPS PDSCH of a larger cell index. If two SPS PDSCH configurations are within the same serving cell, then the activation DCI corresponding to the SPS PDSCH associated with a smaller configuration index should be received prior to the activation DCI of the SPS PDSCH associated with a larger configuration index. This may help guarantee that, regardless of which interpretation a UE follows, the UE may always end up with the same resulting HARQ-ACK CB.

Aspects Related to HARQ-ACK Deferral

In some systems (e.g., in NR R-17), a feature referred to as "SPS HARQ-ACK" deferral has been introduced, where if the PUCCH for HARQ-ACK feedback for SPS PDSCH collides with semi-static downlink symbols, then the SPS HARQ-ACK may be deferred to a later slot with enough OFDM symbols to transmit the PUCCH. In some cases, a dynamically scheduled single-slot HARQ-ACK may not be allowed to be deferred (since it is believed that a gNB has the freedom to dynamically schedule the HARQ-ACK to not overlap with semi-static downlink symbols). This may present a potential challenge in the form of uncertainty regarding whether the deferral could be applied to the HARQ-ACK of the 1st SPS PDSCH after the activation DCI. Depending on different interpretations explained herein, the UE may end up transmitting the HARQ-ACK for the first SPS PDSCH in different slots.

According to certain aspects, however, the UE may be configured to not expect the PUCCH for the HARQ-ACK of the 1st SPS PDSCH after the activation DCI to collide with semi-static DL symbols. In other words, in such cases, the UE may not be expected to defer the HARQ-ACK for the 1st SPS PDSCH after the activation DCI. Similarly, on the network side, the gNB may be configured to try and schedule such that the PUCCH for the HARQ-ACK of the 1st SPS PDSCH after the activation DCI does collide with semi-static DL symbols. In the event the gNB is not able to accomplish this scheduling, the gNB may not expect a deferred HARQ-ACK from the UE for the 1st SPS PDSCH after the activation DCI. In this way, regardless of which interpretation the UE uses, there will not be ambiguity as to whether the UE defers the SPS HARQ-ACK or not.

Example Operations

Figure 9:
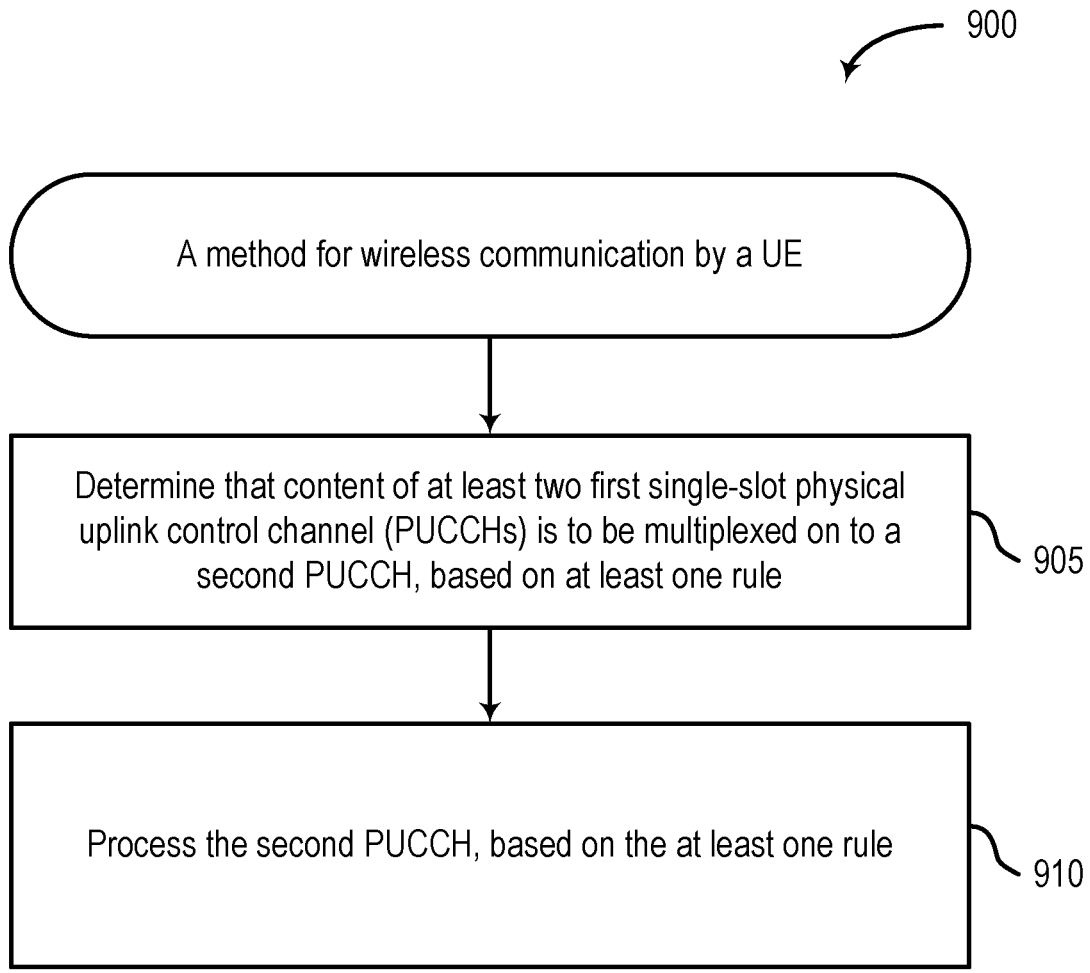
FIG. 9 depicts a method for wireless communication by a UE, in accordance with aspects of the present disclosure.

FIG. 9 shows a method 900 for wireless communication by a UE, such as UE 104 of FIGS. 1 and 3.

Method 900 begins at 905 by determining that content of at least two first single-slot physical uplink control channel (PUCCHs) is to be multiplexed on to a second PUCCH, based on at least one rule. Method 900 then proceeds to step 910 by processing the second PUCCH, based on the at least one rule.

Figure 10:
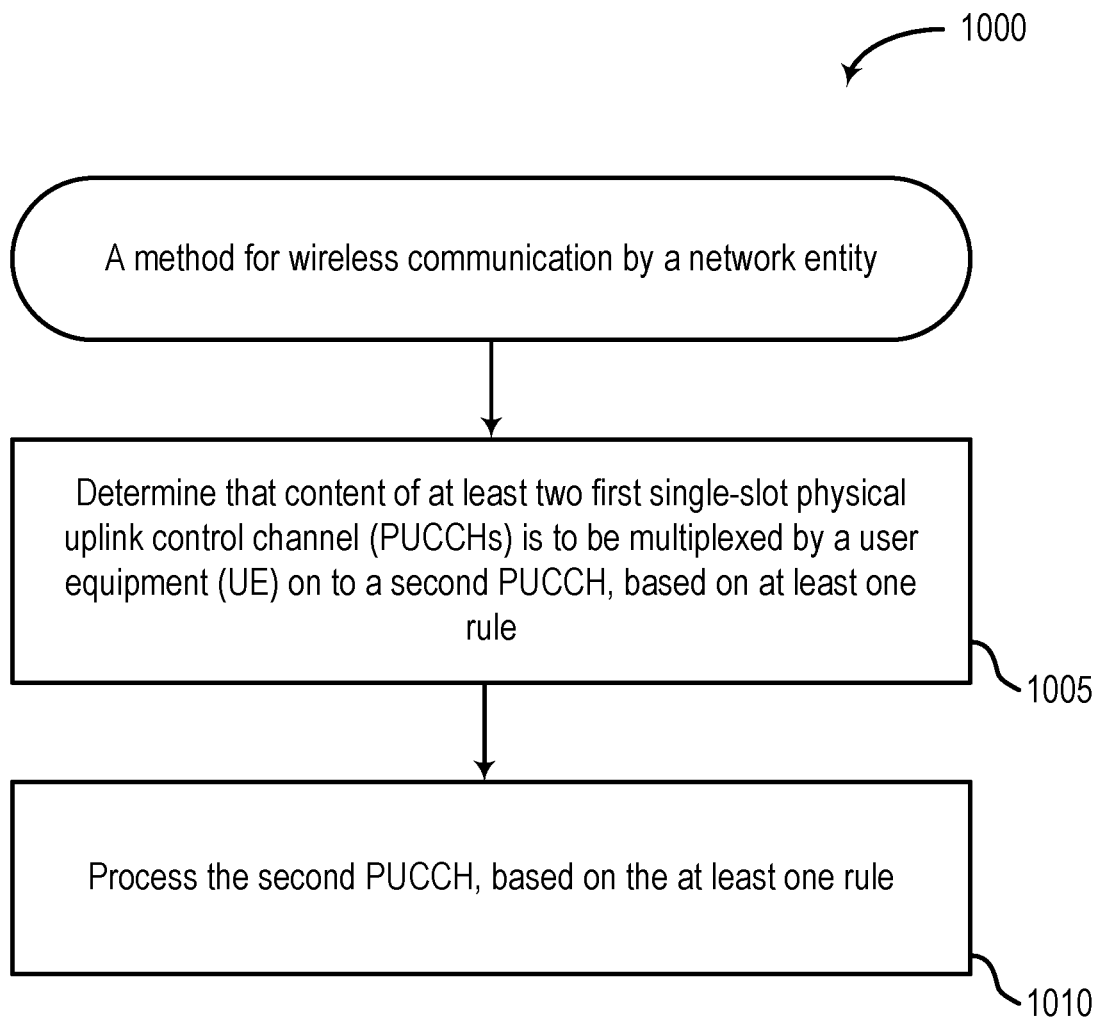
FIG. 10 depicts a method for wireless communication by a network entity, in accordance with aspects of the present disclosure.

FIG. 10 shows a method 1000 for wireless communication by a network entity, such as BS 102 of FIGS. 1 and 3 (or some component of a disaggregated base station).

Method 1000 begins at 1005 by determining that content of at least two first single-slot physical uplink control channel (PUCCHs) is to be multiplexed by a user equipment (UE) on to a second PUCCH, based on at least one rule. Method 1000 then proceeds to step 1010 by processing the second PUCCH, based on the at least one rule.

Figure 11:
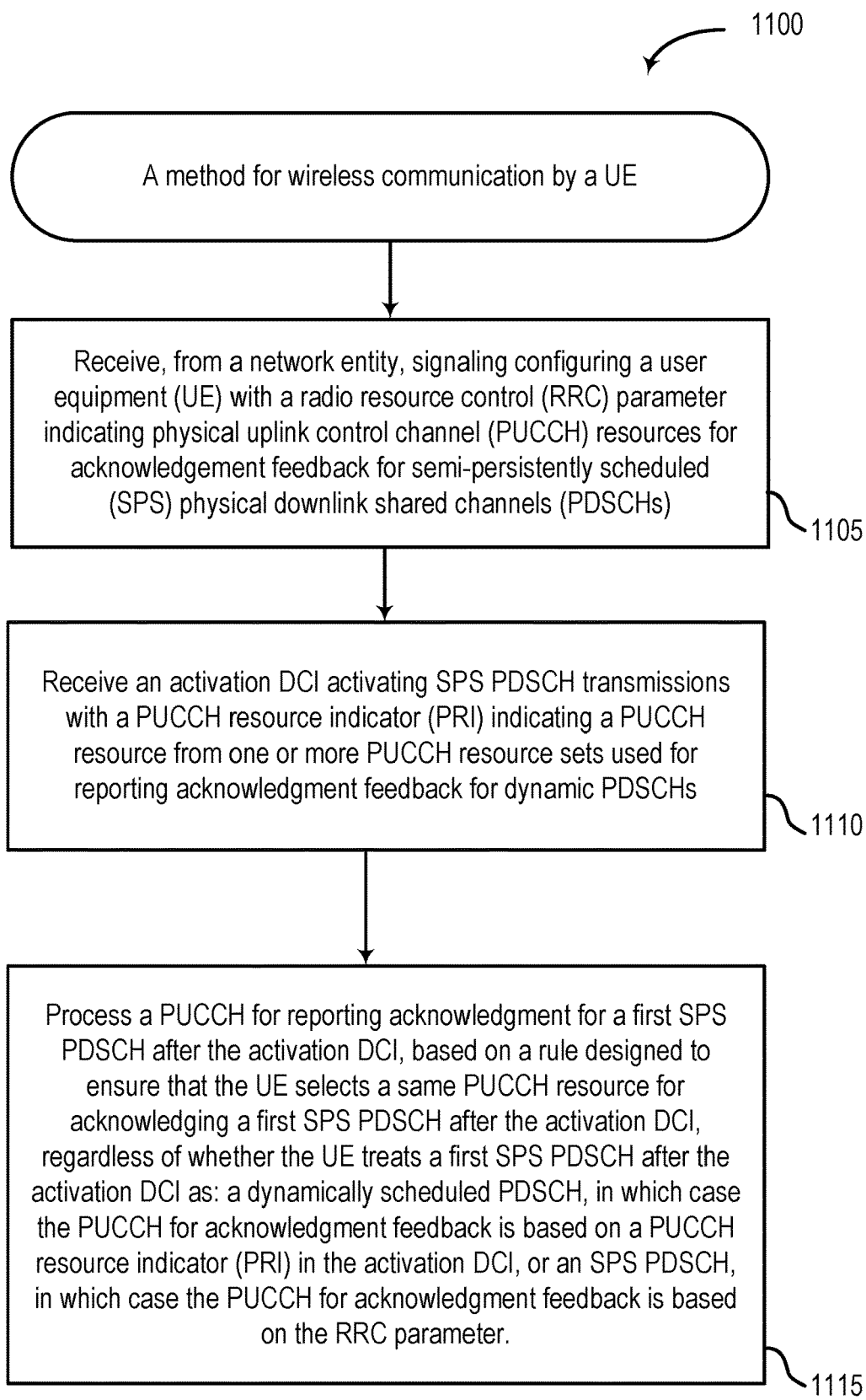
FIG. 11 depicts a method for wireless communication by a UE, in accordance with aspects of the present disclosure.

FIG. 11 shows a method 900 for wireless communication by a UE, such as UE 104 of FIGS. 1 and 3.

Figure 12:
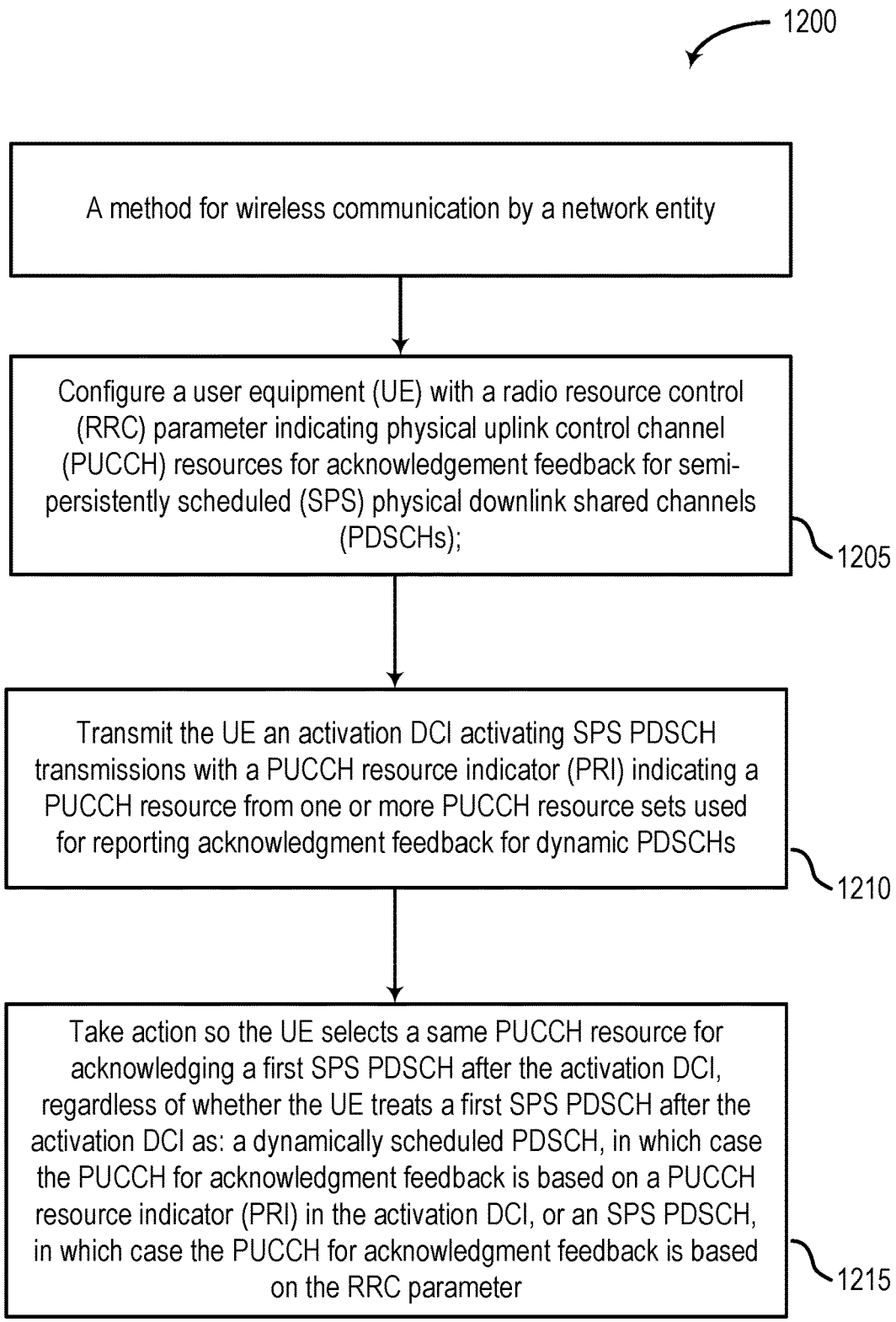
FIG. 12 depicts a method for wireless communication by a network entity, in accordance with aspects of the present disclosure.

Method 1100 begins at 1105 by receiving, from a network entity, signaling configuring a user equipment (UE) with a radio resource control (RRC) parameter indicating physical uplink control channel (PUCCH) resources for acknowledgement feedback for semi-persistently scheduled (SPS) physical downlink shared channels (PDSCHs). Method 1100 then proceeds to step 1110 by receiving an activation DCI activating SPS PDSCH transmissions with a PUCCH resource indicator (PRI) indicating a PUCCH resource from one or more PUCCH resource sets used for reporting acknowledgment feedback for dynamic PDSCHs. Method 1100 then proceeds to step 1115 by processing a PUCCH for reporting acknowledgment for a first SPS PDSCH after the activation DCI, based on a rule designed to ensure that the UE selects a same PUCCH resource for acknowledging a first SPS PDSCH after the activation DCI, regardless of whether the UE treats a first SPS PDSCH after the activation DCI as: a dynamically scheduled PDSCH, in which case the PUCCH for acknowledgment feedback is based on a PUCCH resource indicator (PRI) in the activation DCI, or an SPS PDSCH, in which case the PUCCH for acknowledgment feedback is based on the RRC parameter FIG. 12 shows a method 1200 for wireless communication by a network entity, such as BS 102 of FIGS. 1 and 3 (or some component of a disaggregated base station).

Method 1200 begins at 1205 by configuring a user equipment (UE) with a radio resource control (RRC) parameter indicating physical uplink control channel (PUCCH) resources for acknowledgement feedback for semi-persistently scheduled (SPS) physical downlink shared channels (PDSCHs). Method 1200 then proceeds to step 1210 by transmitting the UE an activation DCI activating SPS PDSCH transmissions with a PUCCH resource indicator (PRI) indicating a PUCCH resource from one or more PUCCH resource sets used for reporting acknowledgment feedback for dynamic PDSCHs. Method 1200 then proceeds to step 1215 by taking action so the UE selects a same PUCCH resource for acknowledging a first SPS PDSCH after the activation DCI, regardless of whether the UE treats a first SPS PDSCH after the activation DCI as a dynamically scheduled PDSCH, in which case the PUCCH for acknowledgment feedback is based on a PUCCH resource indicator (PRI) in the activation DCI, or an SPS PDSCH, in which case the PUCCH for acknowledgment feedback is based on the RRC parameter.

Example Communications Device

Figure 13:
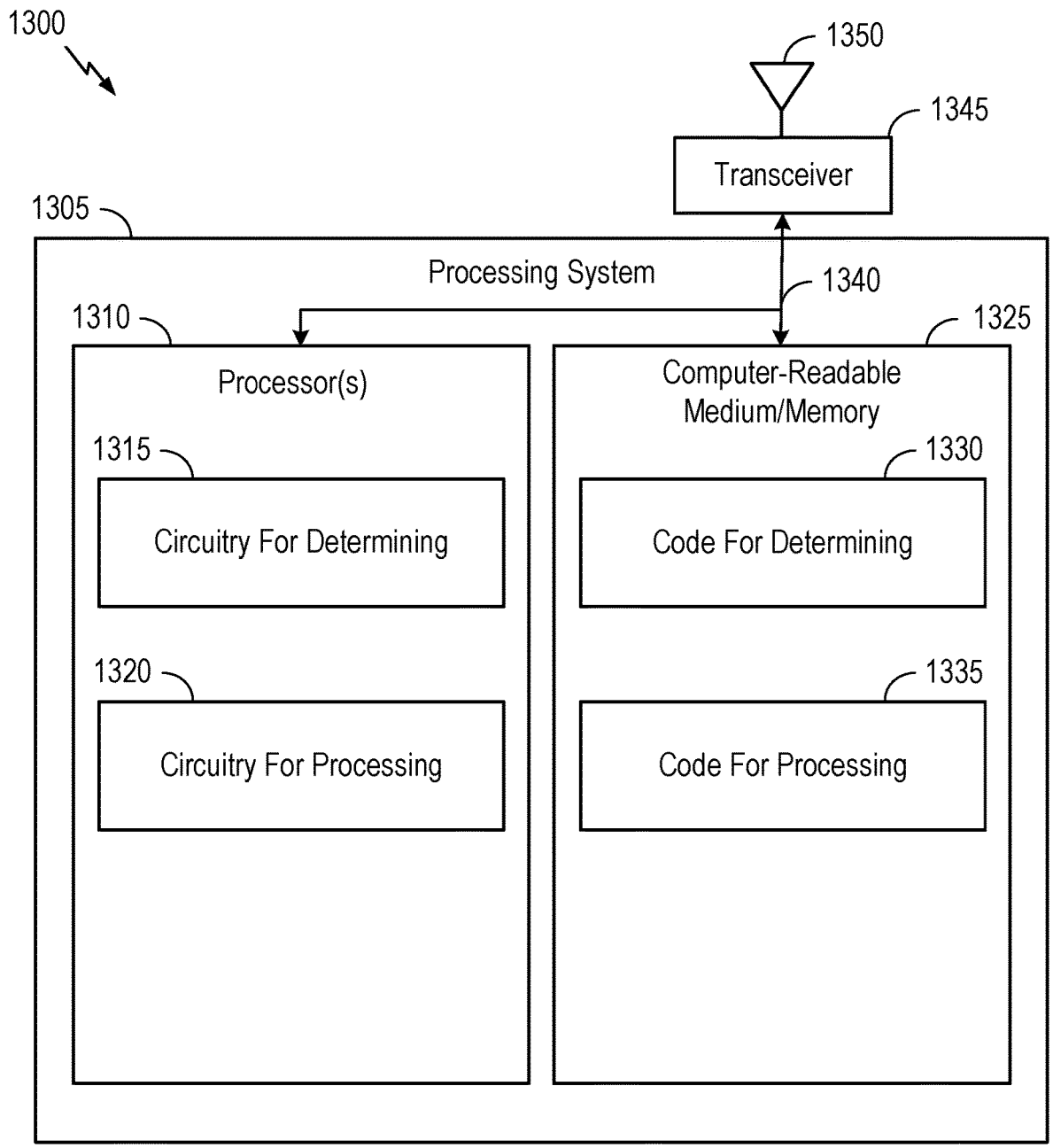
FIGS. 13-15 depict aspects of example communications devices.

FIG. 13 depicts aspects of an example communications device 1300. In some aspects, communications device 1300 is a user equipment, such as a network entity (e.g., BS 102) or a UE 104 described above with respect to FIGS. 1 and 3.

The communications device 1300 includes a processing system 1305 coupled to the transceiver 1355 (e.g., a transmitter and/or a receiver). The transceiver 1355 is configured to transmit and receive signals for the communications device 1300 via the antenna 1360, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1330 via a bus 1350. In certain aspects, the computer-readable medium/memory 1330 is configured to store instructions (e.g., computer-executable code) that when executed by the one or more processors 1310, cause the one or more processors 1310 to perform the method 900 or 1000 described with respect to FIG. 9 or 10, or any aspect related to it. Note that reference to a processor performing a function of communications device 1300 may include one or more processors 1310 performing that function of communications device 1300.

In the depicted example, computer-readable medium/memory 1325 stores code (e.g., executable instructions), such as code for determining 1330 and code for processing 1335, which may cause the communications device 1300 to perform the method 900 described with respect to FIG. 9 or method 1000 described with respect to FIG. 10, or any aspect related to it.

The one or more processors 1310 include circuitry configured to implement (e.g., execute) the code stored in the computer-readable medium/memory 1330, including circuitry such as circuitry for determining 1315 and circuitry for processing 1320, which may cause the communications device 1300 to perform the methods 900 or 1000 described with respect to FIG. 9 or 10, or any aspect related to it.

Various components of the communications device 1300 may provide means for performing the method 900 or 1000 described with respect to FIG. 9 or 10, or any aspect related to it. For example, means for transmitting, sending or outputting for transmission may include transceivers 354 and/or antenna(s) 352 of the UE 104 illustrated in FIG. 3 and/or the transceiver 1355 and the antenna 1360 of the communications device 1300 in FIG. 13. Means for receiving or obtaining may include transceivers 354 and/or antenna(s) 352 of the UE 104 illustrated in FIG. 3 and/or the transceiver 1355 and the antenna 1360 of the communications device 1300 in FIG. 13.

Figure 14:
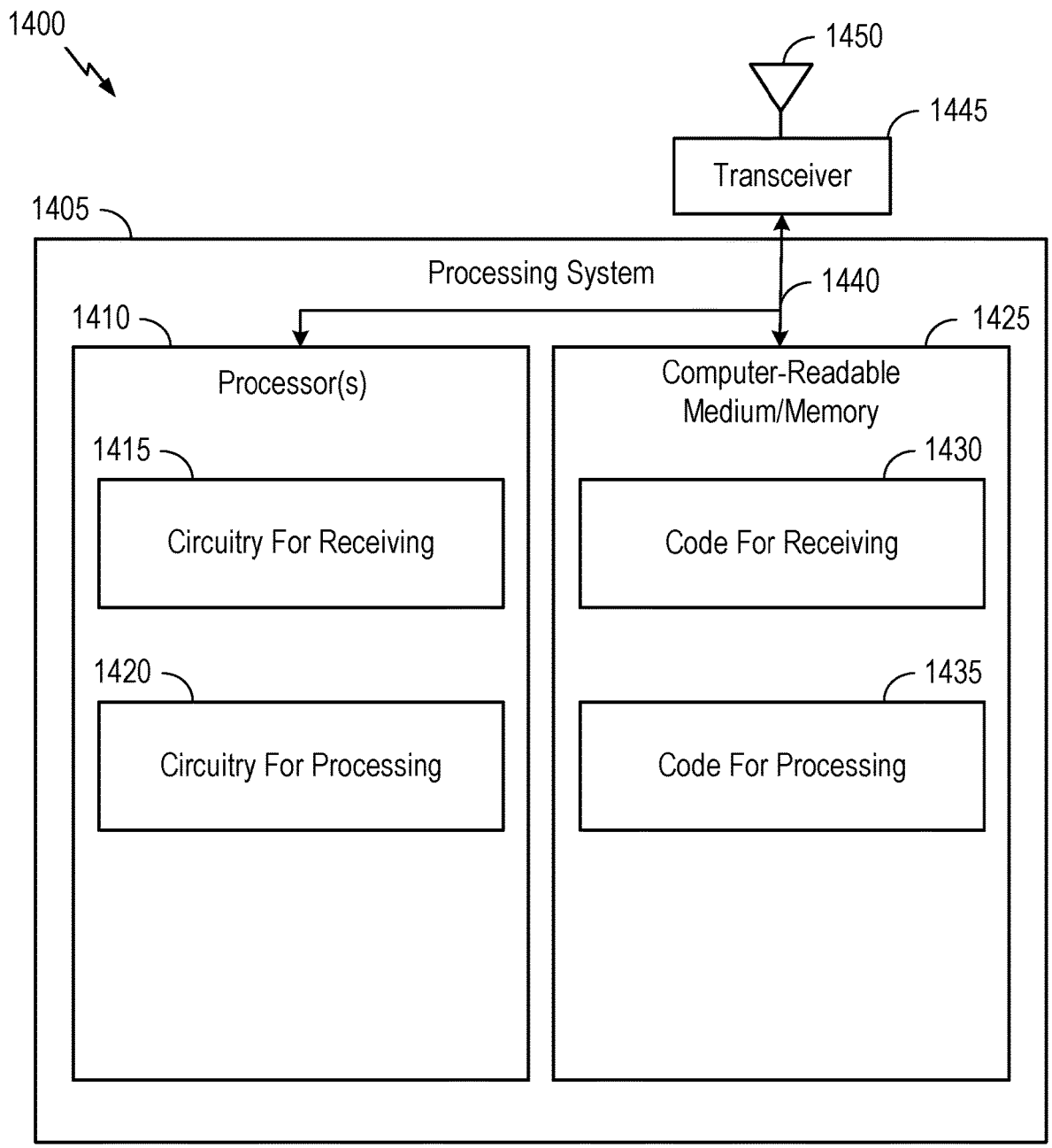

FIG. 14 depicts aspects of an example communications device 1400. In some aspects, communications device 1400 is a user equipment, such as a UE 104 described above with respect to FIGS. 1 and 3.

The communications device 1400 includes a processing system 1405 coupled to the transceiver 1455 (e.g., a transmitter and/or a receiver). The transceiver 1455 is configured to transmit and receive signals for the communications device 1400 via the antenna 1460, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. The one or more processors 1410 are coupled to a computer-readable medium/memory 1430 via a bus 1450. In certain aspects, the computer-readable medium/memory 1430 is configured to store instructions (e.g., computer-executable code) that when executed by the one or more processors 1410, cause the one or more processors 1410 to perform the method 1100 described with respect to FIG. 11, or any aspect related to it. Note that reference to a processor performing a function of communications device 1400 may include one or more processors 1410 performing that function of communications device 1400.

In the depicted example, computer-readable medium/memory 1425 stores code (e.g., executable instructions), such as code for receiving 1430 and code for processing 1435, which may cause the communications device 1400 to perform the method 1100 with respect to FIG. 11 or any aspect related to it.

The one or more processors 1410 include circuitry configured to implement (e.g., execute) the code stored in the computer-readable medium/memory 1430, including circuitry such as circuitry for receiving 1415 and circuitry for processing 1420, which may cause the communications device 1400 to perform the method 1100 described with respect to FIG. 11, or any aspect related to it.

Various components of the communications device 1400 may provide means for performing the method 1100 described with respect to FIG. 11, or any aspect related to it. For example, means for transmitting, sending or outputting for transmission may include transceivers 354 and/or antenna(s) 352 of the UE 104 illustrated in FIG. 3 and/or the transceiver 1455 and the antenna 1460 of the communications device 1400 in FIG. 14. Means for receiving or obtaining may include transceivers 354 and/or antenna(s) 352 of the UE 104 illustrated in FIG. 3 and/or the transceiver 1455 and the antenna 1460 of the communications device 1400 in FIG. 14.

Figure 15:
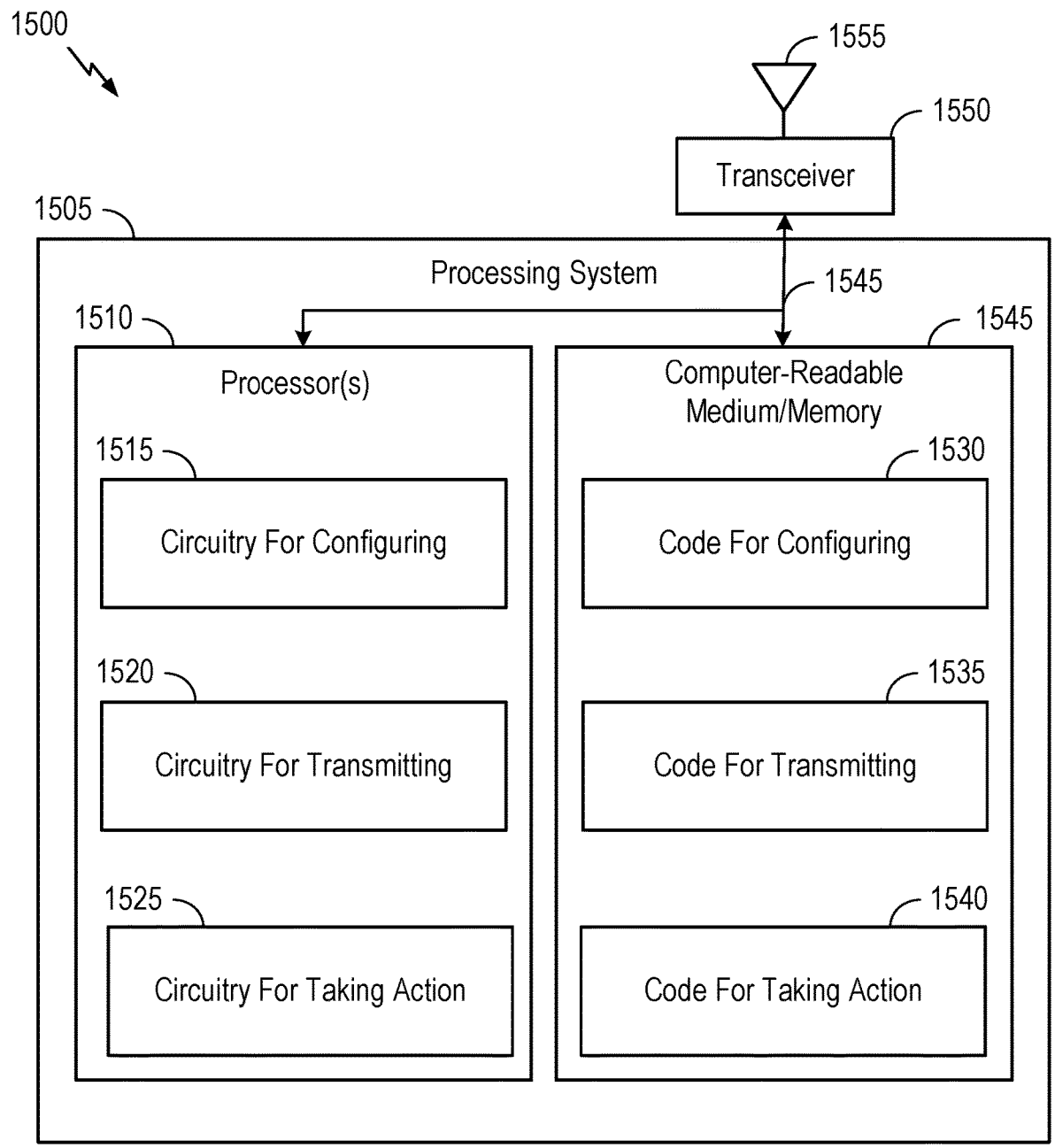

FIG. 15 depicts aspects of an example communications device 1500. In some aspects, communications device 1500 is a network entity, such as a BS 102 described above with respect to FIGS. 1 and 3.

The communications device 1500 includes a processing system 1505 coupled to the transceiver 1555 (e.g., a transmitter and/or a receiver). The transceiver 1555 is configured to transmit and receive signals for the communications device 1500 via the antenna 1560, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. The one or more processors 1510 are coupled to a computer-readable medium/memory 1530 via a bus 1550. In certain aspects, the computer-readable medium/memory 1530 is configured to store instructions (e.g., computer-executable code) that when executed by the one or more processors 1510, cause the one or more processors 1510 to perform the method 1200 described with respect to FIG. 12, or any aspect related to it. Note that reference to a processor performing a function of communications device 1500 may include one or more processors 1510 performing that function of communications device 1500.

In the depicted example, computer-readable medium/memory 1525 stores code (e.g., executable instructions), such as code for configuring 1530, code for transmitting 1535, and code for taking action 1540 which may cause the communications device 1500 to perform the method 1200 with respect to FIG. 12 or any aspect related to it.

The one or more processors 1510 include circuitry configured to implement (e.g., execute) the code stored in the computer-readable medium/memory 1530, including circuitry such as circuitry for configuring 1515, code for transmitting 1520, and code for taking action 1525, which may cause the communications device 1500 to perform the method 1200 described with respect to FIG. 12, or any aspect related to it.

Various components of the communications device 1500 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3 and/or the transceiver 1555 and the antenna 1560 of the communications device 1500 in FIG. 15. Means for receiving or obtaining may include transceivers 354 and/or antenna(s) 352 of the UE 104 illustrated in FIG. 3 and/or the transceiver 1555 and the antenna 1560 of the communications device 1500 in FIG. 15.

Example Clauses

Implementation examples are described in the following numbered clauses:

Clause 1: A method for wireless communication by a user-equipment (UE), comprising: determining that content of at least two first single-slot physical uplink control channel (PUCCHs) is to be multiplexed on to a second PUCCH based on at least one rule; and processing the second PUCCH, based on the at least one rule.

Clause 2: The method of Clause 1, wherein, according to the at least one rule, the UE does not expect the second PUCCH to be configured with repetition; and processing the second PUCCH comprises refraining from transmitting the second PUCCH.

Clause 3: The method of any one of Clauses 1-2, wherein, according to the at least one rule, the UE does not expect the second PUCCH to be configured with repetition if the content of the at least two first single-slot PUCCHs to be multiplexed on to a second PUCCH comprises: uplink control information (UCI) of a same priority or UCI of different priorities.

Clause 4: The method of any one of Clauses 1-3, wherein, according to the at least one rule, the UE does not expect at least one of: the second PUCCH to overlap in time with one or more other PUCCHs; or the second PUCCH to be deferred for any reason.

Clause 5: The method of any one of Clauses 1-4, wherein: the content of the at least two first single-slot PUCCHs to be multiplexed on to a second PUCCH comprises multiple types or multiple priorities of uplink control information (UCI); and according to the at least one rule, the UE determines a priority of the second PUCCH based on a highest priority of the multiple types or multiple priorities of UCI.

Clause 6: A processing system, comprising: a memory comprising computer-executable instructions; one or more processors configured to execute the computer-executable instructions and cause the processing system to perform a method in accordance with any one of Clauses 1-5.

Clause 7: A processing system, comprising means for performing a method in accordance with any one of Clauses 1-5.

Clause 8: A non-transitory computer-readable medium comprising computer-executable instructions that, when executed by one or more processors of a processing system, cause the processing system to perform a method in accordance with any one of Clauses 1-5.

Clause 9: A computer program product embodied on a computer-readable storage medium comprising code for performing a method in accordance with any one of Clauses 1-5.

Clause 10: A method for wireless communication by a network entity, comprising: determining that content of at least two first single-slot physical uplink control channel (PUCCHs) is to be multiplexed by a user equipment (UE) on to a second PUCCH, based on at least one rule; and processing the second PUCCH, based on the at least one rule.

Clause 11: The method of Clause 10, wherein: according to the at least one rule, the network entity does not expect the UE to transmit the second PUCCH, if the second PUCCH is configured with repetition.

Clause 12: The method of any one of Clauses 10-11, wherein, according to the at least one rule, the network entity does not expect the UE to transmit the second PUCCH if the second PUCCH is configured with repetition if the content of the at least two first single-slot PUCCHs to be multiplexed on to a second PUCCH comprises: uplink control information (UCI) of a same priority; or UCI of different priorities.

Clause 13: The method of any one of Clauses 10-12, wherein, according to the at least one rule, the network entity does not expect the UE to transmit the second PUCCH if: the second PUCCH overlaps in time with one or more other PUCCHs; or the second PUCCH is to be deferred for any reason.

Clause 14: A processing system, comprising: a memory comprising computer-executable instructions; one or more processors configured to execute the computer-executable instructions and cause the processing system to perform a method in accordance with any one of Clauses 10-13.

Clause 15: A processing system, comprising means for performing a method in accordance with any one of Clauses 10-13.

Clause 16: A non-transitory computer-readable medium comprising computer-executable instructions that, when executed by one or more processors of a processing system, cause the processing system to perform a method in accordance with any one of Clauses 10-13.

Clause 17: A computer program product embodied on a computer-readable storage medium comprising code for performing a method in accordance with any one of Clauses 10-13.

Clause 18: A method for wireless communication by a user-equipment (UE), comprising: receiving, from a network entity, signaling configuring a user equipment (UE) with a radio resource control (RRC) parameter indicating physical uplink control channel (PUCCH) resources for acknowledgement feedback for semi-persistently scheduled (SPS) physical downlink shared channels (PDSCHs); receiving an activation DCI activating SPS PDSCH transmissions with a PUCCH resource indicator (PRI) indicating a PUCCH resource from one or more PUCCH resource sets used for reporting acknowledgment feedback for dynamic PDSCHs; and processing a PUCCH for reporting acknowledgment for a first SPS PDSCH after the activation DCI, based on a rule designed to ensure that the UE selects a same PUCCH resource for acknowledging a first SPS PDSCH after the activation DCI, regardless of whether the UE treats a first SPS PDSCH after the activation DCI as: a dynamically scheduled PDSCH, in which case the PUCCH for acknowledgment feedback is based on a PUCCH resource indicator (PRI) in the activation DCI, or an SPS PDSCH, in which case the PUCCH for acknowledgment feedback is based on the RRC parameter.

Clause 19: The method of Clause 18, wherein: the RRC parameter indicates just one PUCCH resource; the rule dictates that the PRI indicates the same PUCCH resource as the indicated by the RRC parameter.

Clause 20: The method of any one of Clauses 18-19, wherein: the RRC parameter indicates a PUCCH resource; and the rule dictates that PUCCH resource indicated by the RRC parameter is contained in one of the PUCCH resource sets used for reporting acknowledgment feedback for dynamic PDSCHs.

Clause 21: The method of any one of Clauses 18-20, wherein: the RRC parameter indicates a list of PUCCH resources; and the rule dictates that every PUCCH resource in the list of PUCCH resources is contained in one of the PUCCH resource sets used for reporting acknowledgment feedback for dynamic PDSCHs.

Clause 22: The method of Clause 21, wherein: the rule dictates that a payload size range for each PUCCH resource in the list of PUCCH resources is the same as a payload size range for the PUCCH resource sets used for reporting acknowledgment feedback for dynamic PDSCHs.

Clause 23: The method of any one of Clauses 18-22, wherein: the rule dictates that the PUCCH for the activation DCI is a last DCI that triggers acknowledgment feedback in a same slot or subslot.

Clause 24. The method of any one of Clauses 18-23, wherein the rule dictates that a PUCCH resource the UE selects for acknowledging a first SPS PDSCH after the activation DCI does not collide with semi-static downlink symbols, regardless of whether the UE treats a first SPS PDSCH after the activation DCI as a dynamically scheduled PDSCH or an SPS PDSCH.

Clause 25: A processing system, comprising: a memory comprising computer-executable instructions; one or more processors configured to execute the computer-executable instructions and cause the processing system to perform a method in accordance with any one of Clauses 18-24.

Clause 26: A processing system, comprising means for performing a method in accordance with any one of Clauses 18-24.

Clause 27: A non-transitory computer-readable medium comprising computer-executable instructions that, when executed by one or more processors of a processing system, cause the processing system to perform a method in accordance with any one of Clauses 18-24.

Clause 28: A computer program product embodied on a computer-readable storage medium comprising code for performing a method in accordance with any one of Clauses 18-24.

Clause 29: A method for wireless communication by a network entity, comprising: configuring a user equipment (UE) with a radio resource control (RRC) parameter indicating physical uplink control channel (PUCCH) resources for acknowledgement feedback for semi-persistently scheduled (SPS) physical downlink shared channels (PDSCHs); transmitting the UE an activation DCI activating SPS PDSCH transmissions with a PUCCH resource indicator (PRI) indicating a PUCCH resource from one or more PUCCH resource sets used for reporting acknowledgment feedback for dynamic PDSCHs; and taking action so the UE selects a same PUCCH resource for acknowledging a first SPS PDSCH after the activation DCI, regardless of whether the UE treats a first SPS PDSCH after the activation DCI as: a dynamically scheduled PDSCH, in which case the PUCCH for acknowledgment feedback is based on a PUCCH resource indicator (PRI) in the activation DCI, or an SPS PDSCH, in which case the PUCCH for acknowledgment feedback is based on the RRC parameter.

Clause 30: The method of Clause 29, wherein: the RRC parameter indicates just one PUCCH resource; taking action comprises indicating, in the PRI, the same PUCCH resource as the indicated by the RRC parameter.

Clause 31: The method of any one of Clauses 29-30, wherein: the RRC parameter indicates a PUCCH resource; and taking action comprises ensuring that PUCCH resource indicated by the RRC parameter is contained in one of the PUCCH resource sets used for reporting acknowledgment feedback for dynamic PDSCHs.

Clause 32: The method of any one of Clauses 29-31, wherein: the RRC parameter indicates a list of PUCCH resources; and taking action comprises ensuring that every PUCCH resource in the list of PUCCH resources is contained in one of the PUCCH resource sets used for reporting acknowledgment feedback for dynamic PDSCHs.

Clause 33: The method of Clause 32, wherein: taking action also comprises ensuring that a payload size range for each PUCCH resource in the list of PUCCH resources is the same as a payload size range for the PUCCH resource sets used for reporting acknowledgment feedback for dynamic PDSCHs.

Clause 34: The method of any one of Clauses 29-33, wherein: taking action comprises ensuring that the PUCCH for the activation DCI is a last DCI that triggers acknowledgment feedback in a same slot or subslot.

Clause 35: The method of any one of Clauses 29-34, wherein taking action comprises: ensuring that a PUCCH resource the UE selects for acknowledging a first SPS PDSCH after the activation DCI does not collide with semi-static downlink symbols, regardless of whether the UE treats a first SPS PDSCH after the activation DCI as a dynamically scheduled PDSCH or an SPS PDSCH.

Clause 36: A processing system, comprising: a memory comprising computer-executable instructions; one or more processors configured to execute the computer-executable instructions and cause the processing system to perform a method in accordance with any one of Clauses 29-35.

Clause 37: A processing system, comprising means for performing a method in accordance with any one of Clauses 29-35.

Clause 38: A non-transitory computer-readable medium comprising computer-executable instructions that, when executed by one or more processors of a processing system, cause the processing system to perform a method in accordance with any one of Clauses 29-35.

Clause 39: A computer program product embodied on a computer-readable storage medium comprising code for performing a method in accordance with any one of Clauses 29-35.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user-equipment (UE), comprising:
    determining that content of at least two first single-slot physical uplink control channels (PUCCHs) is to be multiplexed on to a second PUCCH, based on at least one rule;
    processing the second PUCCH, based on the at least one rule, wherein according to the at least one rule, the UE does not expect the second PUCCH to be configured with repetition; and
    processing the second PUCCH comprises refraining from transmitting the second PUCCH if the second PUCCH is configured with repetition.

2. The method of claim 1, wherein, according to the at least one rule, the UE does not expect the second PUCCH to be configured with repetition if the content of the at least two first single-slot PUCCHs to be multiplexed on to a second PUCCH comprises:
    uplink control information (UCI) of a same priority; or
    UCI of different priorities.

3. The method of claim 1, wherein, according to the at least one rule, the UE does not expect at least one of:
    the second PUCCH to overlap in time with one or more other PUCCHs; or
    the second PUCCH to be deferred for any reason.

4. The method of claim 1, wherein:
    the content of the at least two first single-slot PUCCHs to be multiplexed on to a second PUCCH comprises multiple types or multiple priorities of uplink control information (UCI); and according to the at least one rule, the UE determines a priority of the second PUCCH based on a highest priority of the multiple types or multiple priorities of UCI.

5. A method for wireless communication by a network entity, comprising:
   determining that content of at least two first single-slot physical uplink control channel (PUCCHs) is to be multiplexed by a user equipment (UE) on to a second PUCCH, based on at least one rule;
   processing the second PUCCH, based on the at least one rule, wherein according to the at least one rule, the network entity does not expect the UE to transmit the second PUCCH, if the second PUCCH is configured with repetition.

6. The method of claim 5, wherein, according to the at least one rule, the network entity does not expect the UE to transmit the second PUCCH if the second PUCCH is configured with repetition if the content of the at least two first single-slot PUCCHs to be multiplexed on to a second PUCCH comprises:
   uplink control information (UCI) of a same priority; or
   UCI of different priorities.

7. The method of claim 5, wherein, according to the at least one rule, the network entity does not expect the UE to transmit the second PUCCH if:
   the second PUCCH overlaps in time with one or more other PUCCHs; or
   the second PUCCH is to be deferred for any reason.

8. A method for wireless communication by a user-equipment (UE), comprising:
   receiving, from a network entity, signaling configuring a user equipment (UE) with a radio resource control (RRC) parameter indicating physical uplink control channel (PUCCH) resources for acknowledgement feedback for semi-persistently scheduled (SPS) physical downlink shared channels (PDSCHs);
   receiving an activation DCI activating SPS PDSCH transmissions with a PUCCH resource indicator (PRI) indicating a PUCCH resource from one or more PUCCH resource sets used for reporting acknowledgment feedback for dynamic PDSCHs; and
   processing a PUCCH for reporting acknowledgment for a first SPS PDSCH after the activation DCI, based on a rule designed to ensure that the UE selects a same PUCCH resource for acknowledging the first SPS PDSCH after the activation DCI, regardless of whether the UE treats the first SPS PDSCH after the activation DCI as:
      a dynamically scheduled PDSCH, in which case the PUCCH for acknowledgment feedback is based on the PUCCH resource indicator (PRI) in the activation DCI, or
      an SPS PDSCH, in which case the PUCCH for acknowledgment feedback is based on the RRC parameter.

9. The method of claim 8, wherein:
   the RRC parameter indicates just one PUCCH resource; and
   the rule dictates that the PRI indicates the same PUCCH resource as the indicated by the RRC parameter.

10. The method of claim 8, wherein:
    the RRC parameter indicates a PUCCH resource; and
    the rule dictates that PUCCH resource indicated by the RRC parameter is contained in one of the PUCCH resource sets used for reporting acknowledgment feedback for dynamic PDSCHs.

11. The method of claim 8, wherein:
    the RRC parameter indicates a list of PUCCH resources; and
    the rule dictates that every PUCCH resource in the list of PUCCH resources is contained in one of the PUCCH resource sets used for reporting acknowledgment feedback for dynamic PDSCHs.

12. The method of claim 11, wherein:
    the rule dictates that a payload size range for each PUCCH resource in the list of PUCCH resources is the same as a payload size range for the PUCCH resource sets used for reporting acknowledgment feedback for dynamic PDSCHs.

13. The method of claim 8, wherein:
    the rule dictates that the PUCCH for the activation DCI is a last DCI that triggers acknowledgment feedback in a same slot or subslot.

14. The method of claim 8, wherein the rule dictates that:
    a PUCCH resource the UE selects for acknowledging the first SPS PDSCH after the activation DCI does not collide with semi-static downlink symbols, regardless of whether the UE treats the first SPS PDSCH after the activation DCI as a dynamically scheduled PDSCH or an SPS PDSCH.

15. A method for wireless communication by a network entity, comprising:
    configuring a user equipment (UE) with a radio resource control (RRC) parameter indicating physical uplink control channel (PUCCH) resources for acknowledgement feedback for semi-persistently scheduled (SPS) physical downlink shared channels (PDSCHs);
    transmitting the UE an activation DCI activating SPS PDSCH transmissions with a PUCCH resource indicator (PRI) indicating a PUCCH resource from one or more PUCCH resource sets used for reporting acknowledgment feedback for dynamic PDSCHs; and
    taking action so the UE selects a same PUCCH resource for acknowledging a first SPS PDSCH after the activation DCI, regardless of whether the UE treats the first SPS PDSCH after the activation DCI as:
       a dynamically scheduled PDSCH, in which case the PUCCH for acknowledgment feedback is based on a PUCCH resource indicator (PRI) in the activation DCI, or
       an SPS PDSCH, in which case the PUCCH for acknowledgment feedback is based on the RRC parameter.

16. The method of claim 15, wherein:
    the RRC parameter indicates just one PUCCH resource; and
    taking action comprises indicating, in the PRI, the same PUCCH resource as the indicated by the RRC parameter.

17. The method of claim 15, wherein:
    the RRC parameter indicates a PUCCH resource; and
    taking action comprises ensuring that PUCCH resource indicated by the RRC parameter is contained in one of the PUCCH resource sets used for reporting acknowledgment feedback for dynamic PDSCHs.

18. The method of claim 15, wherein:
    the RRC parameter indicates a list of PUCCH resources; and
    taking action comprises ensuring that every PUCCH resource in the list of PUCCH resources is contained in one of the PUCCH resource sets used for reporting acknowledgment feedback for dynamic PDSCHs.

19. The method of claim 18, wherein:
taking action also comprises ensuring that a payload size range for each PUCCH resource in the list of PUCCH resources is the same as a payload size range for the PUCCH resource sets used for reporting acknowledgment feedback for dynamic PDSCHs.

20. The method of claim 15, wherein:
taking action comprises ensuring that the PUCCH for the activation DCI is a last DCI that triggers acknowledgment feedback in a same slot or subslot.

21. The method of claim 15, wherein taking action comprises:
ensuring that a PUCCH resource the UE selects for acknowledging the first SPS PDSCH after the activation DCI does not collide with semi-static downlink symbols, regardless of whether the UE treats the first SPS PDSCH after the activation DCI as a dynamically scheduled PDSCH or an SPS PDSCH.

* * * * *